INVENTORS
ROBERT P. LICKLITER
EARL ABBOTT
JOHN F. REEVES

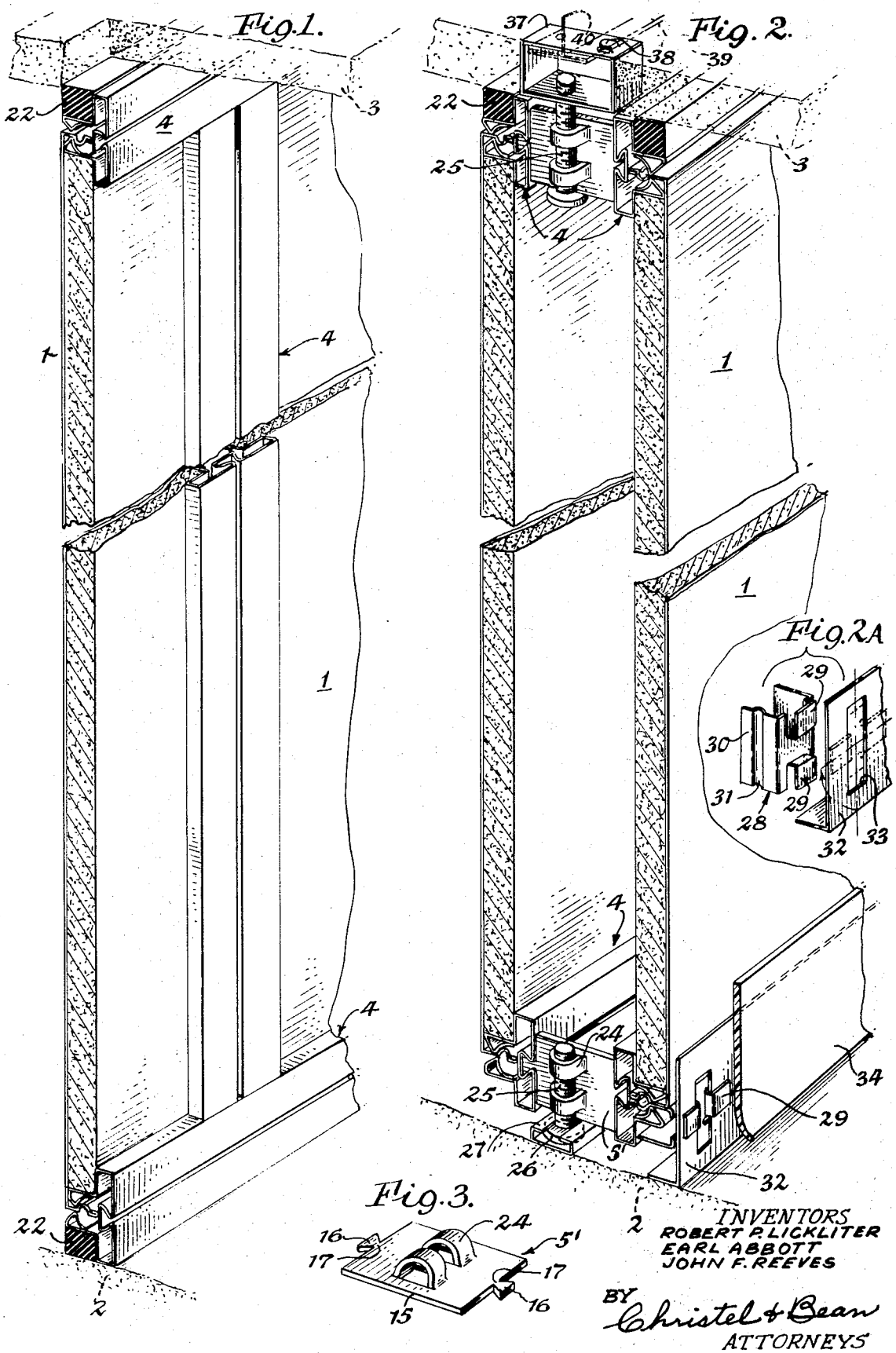

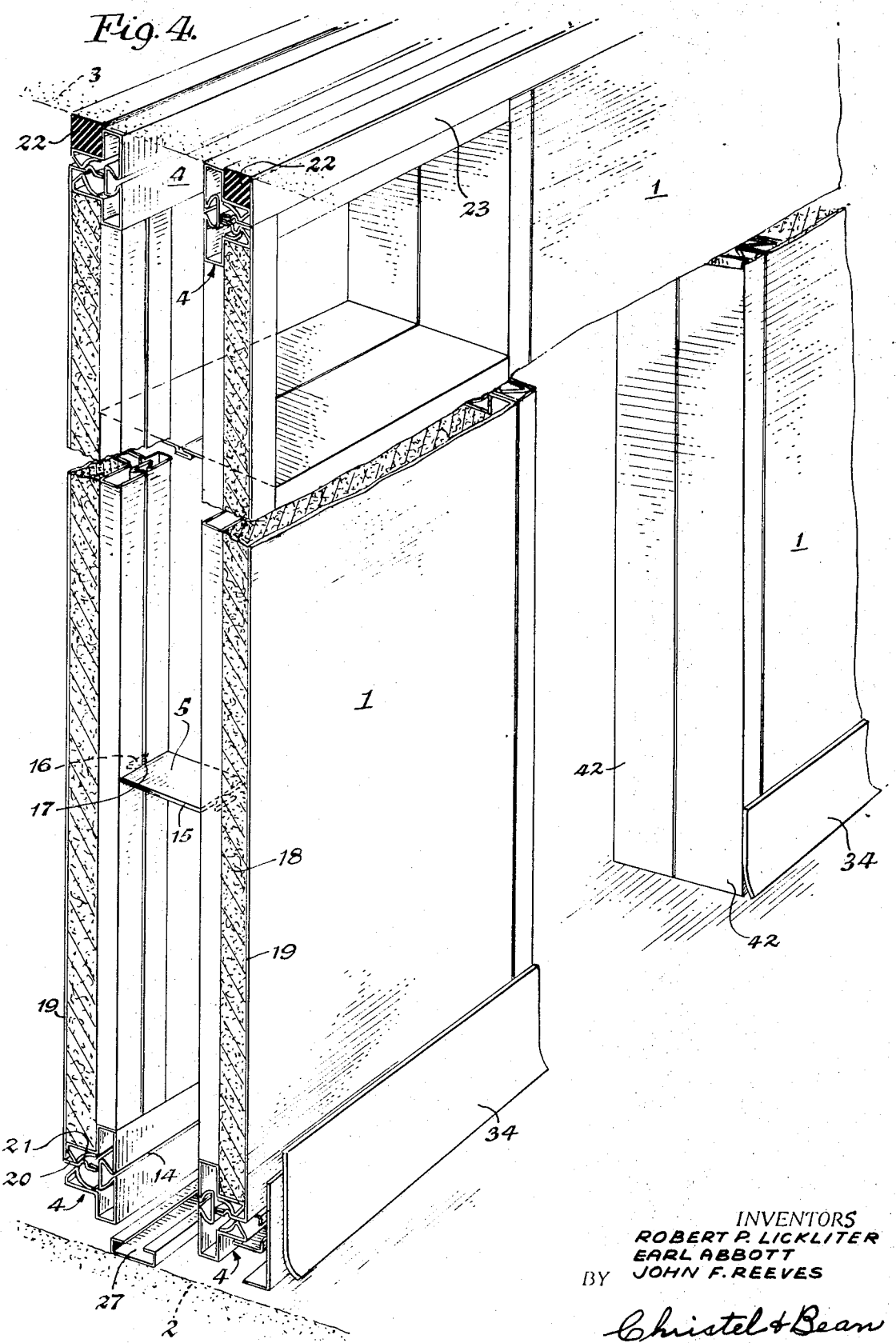

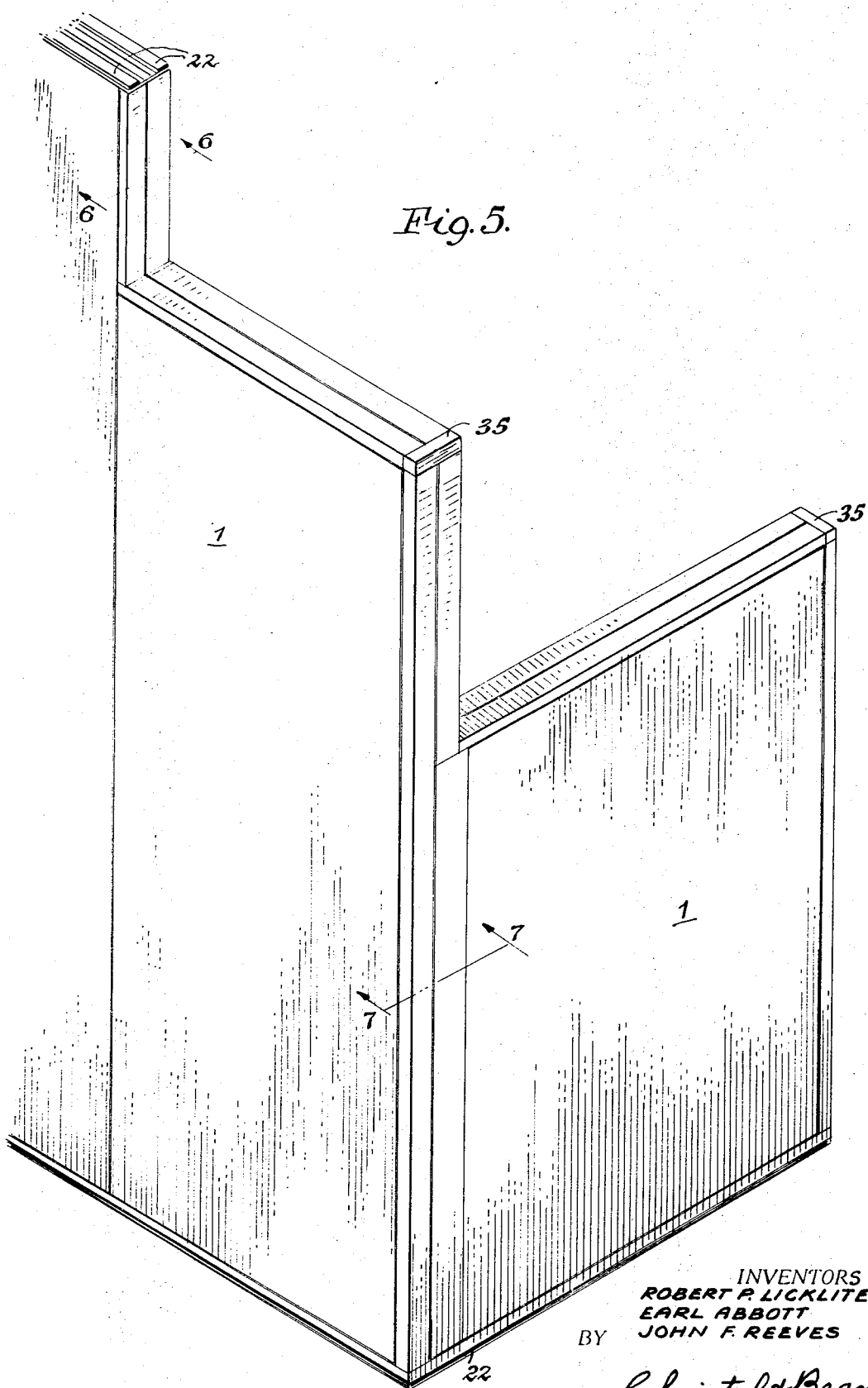

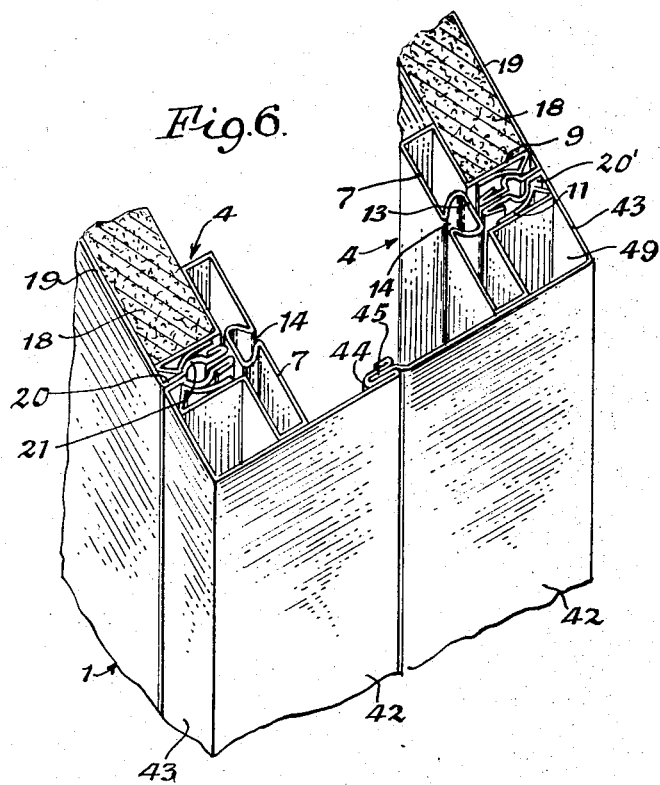
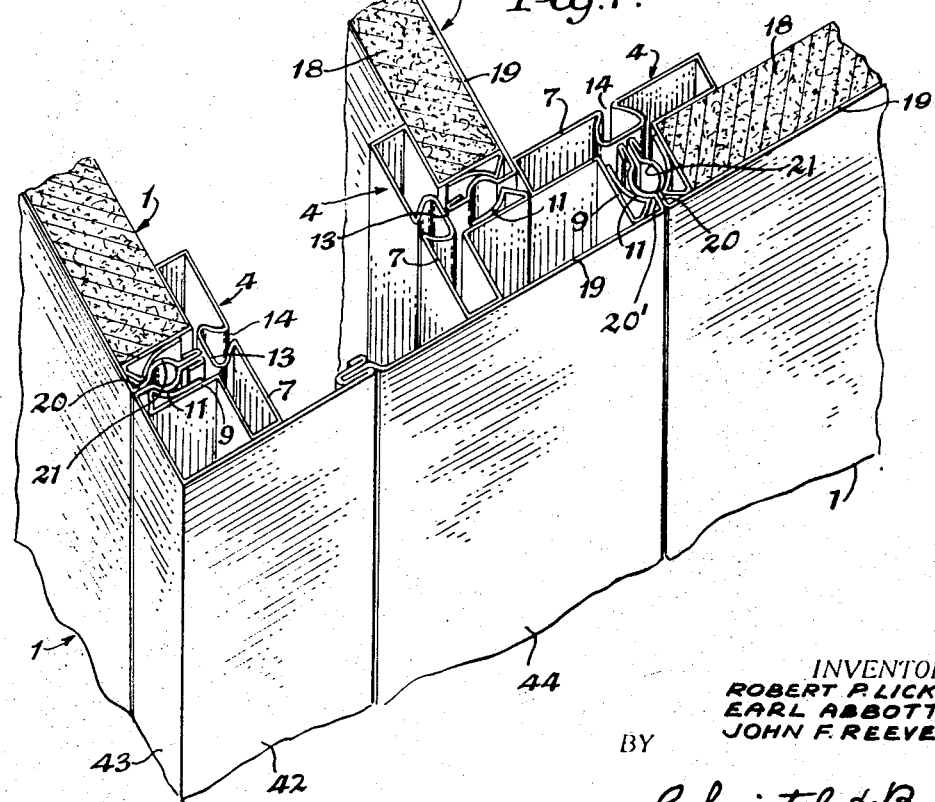

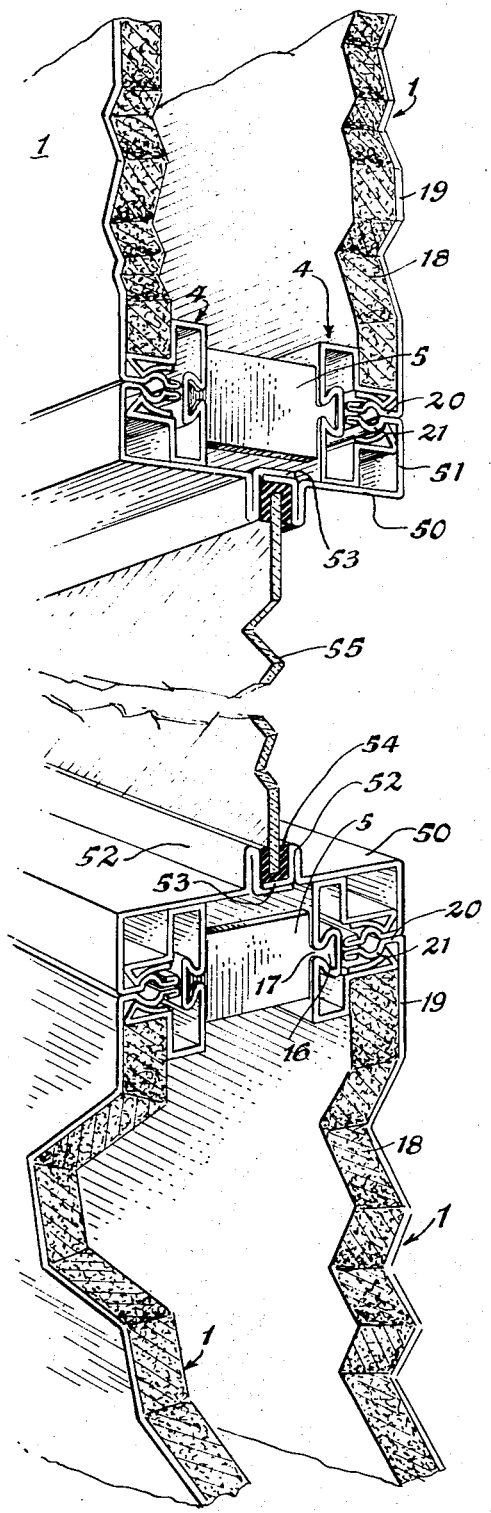
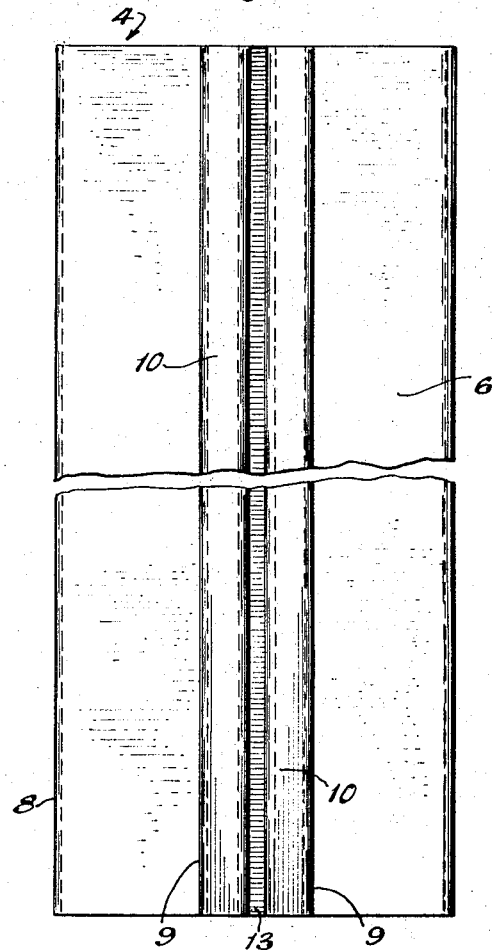
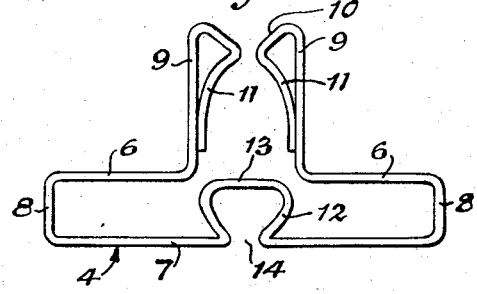

BY Christel + Bean
ATTORNEYS

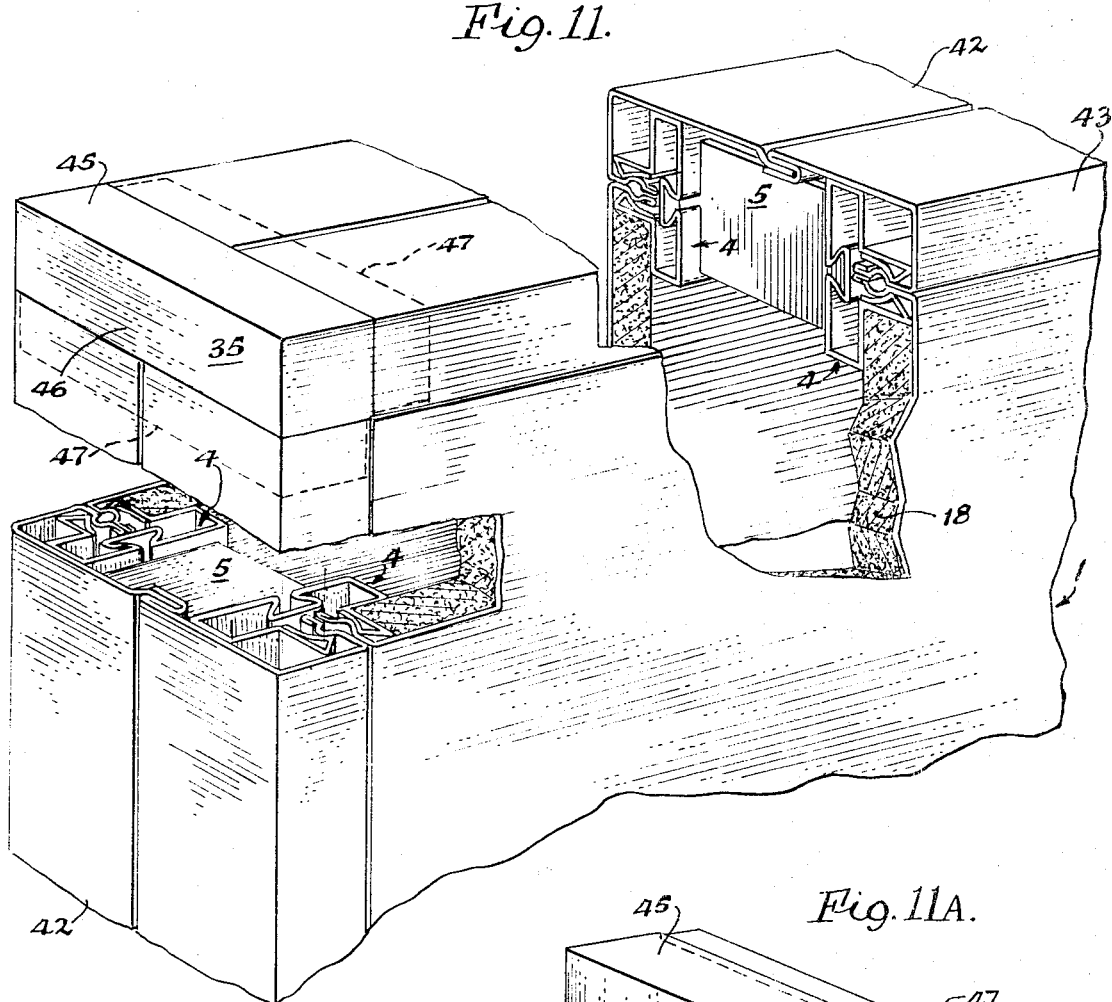
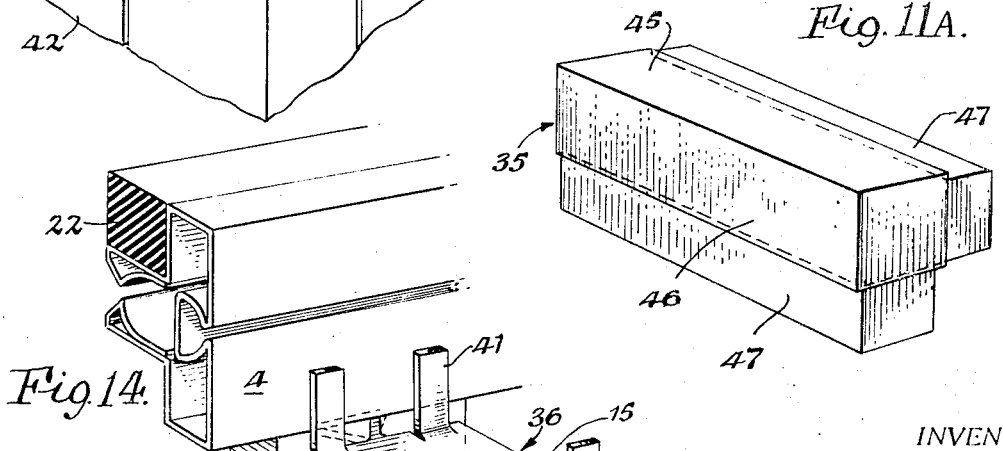

United States Patent Office 3,537,217
Patented Nov. 3, 1970

3,537,217
WALL STRUCTURES
Robert Paul Lickliter and Earl Abbott, Hamburg, and John F. Reeves, Tonawanda, N.Y., assignors, by direct and mesne assignments, to Flangeklamp Corporation, Buffalo, N.Y., a corporation of New York
Filed Feb. 8, 1968, Ser. No. 703,955
Int. Cl. E04b 2/74; E04c 3/04
U.S. Cl. 52—122     12 Claims

ABSTRACT OF THE DISCLOSURE

Panel connectors are arranged in vertical and horizontal alignment to receive and support panel members defining a wall surface. In a double wall structure the opposed panel members are mounted on panel connectors spaced apart by means of detachable spacer clips extending therebetween and having a releasable interlock therewith. The panel connectors are of an elongated, reinforced construction extending substantially the full width and height of the panel members, and only a very few spacer clips are required for a wall structure of high strength and integrity. Spacer clips adapted for adjustable mounting attachment to the floor and ceiling are provided, together with cover plates and corner blocks for the exposed edges of the wall structure. The panel connectors also are usable in single panel wall structures.

BACKGROUND OF THE INVENTION

This invention relates generally to the construction art, and more particularly to certain new and useful partition and perimeter wall constructions.

Partition walls and the like customarily comprise vertical studs, base plates at the floor and ceiling channels or tracks, with wall panels nailed or otherwise secured to the opposite sides of the studs. Various pre-fabricated, modular arrangements have been proposed, in an effort to provide mass produced, low cost constructions which can be readily installed and which also can be easily dismantled when it is desired to remove or shift the position of the wall.

However, those prior art constructions of which we are aware generally utilize full width vertical studs of fixed lateral dimension. Even where they are adapted to accommodate panels of various thicknesses, the spacing between the panels is fixed. If it is desired to provide a double wall construction having a different spacing between the walls, it is necessary either to resort to wood studs, or to manufacture a set of studs having the different desired width. This increases the cost of such constructions.

Also, such fixed studs, which span the entire width between the walls from the upper to the lower end thereof, interfere with the placement of electric conduits, heating pipes and the like between the walls. Even if the web of the stud is cut away at spaced points, to provide openings for this purpose, the number, location and size of such openings impose limitations on the location, number and size of such conduits and pipes.

Also, such studs provide excellent sound and heat transmission between the opposite walls. Sound transmission is particularly annoying, and poses a problem of increasing importance.

Studs comprising members of fixed dimension, having at their opposite sides connecting clips which can be extended and retracted have been proposed. However, these require adjustment and hand labor. Also they still provide a fixed stud running the height of the ceiling between the walls, severely limiting the placement of piping, conduits and the like and providing with the connecting clips an undesirable amount of sound transmission.

SUMMARY OF THE INVENTION

Accordingly, an object of our invention is to provide a double wall construction having a minimum of connection between the opposite wall panels for maximum freedom in the placement of conduits and the like between the wall panels and virtually eliminating direct transmission of sound between the opposite walls.

Another object of our invention is to provide a double wall panel supporting arrangement adapted to accommodate different widths in the spacing between the opposite side panels inexpensively and with no additional effort required of those making the installation.

Still another object of our invention is to provide the foregoing arrangement possessing the requisite stability and strength while being quickly and easily set up and dismantled.

It is also an object of our invention to provide a panel supporting arrangement which is adopted for single panel as well as double panel walls, and for all types of wall structures including both perimeter and partition walls.

In carrying out our invention, we utilize elongated panel connectors adapted to extend along the side edge portions of the panels, in conjunction with spacer clips extending between the connectors, the clips and connectors having a detachable interlock. To vary the spacing between the opposite walls, only the spacer clips need be varied, and these can be simple and relatively inexpensive in construction.

The foregoing and other objects, advantages and characterizing features of our invention will become clearly apparent from the ensuing detailed description of an illustrative embodiment thereof, taken together with the accompanying drawings wherein like reference numerals denote like parts throughout the various views.

DESCRIPTION OF THE DRAWING FIGURES

FIG. 1 is a fragmentary perspective view, partly in section, showing a portion of one wall of a partition constructed in accordance with our invention;

FIG. 2 is a fragmentary perspective view generally similar to that of FIG. 1 but showing both walls of the partition and the floor and ceiling mounting thereof;

FIG. 2A is a fragmentary perspective view of a base fastening clip used with our invention;

FIG. 3 is a perspective view of a spacer clip used in conjunction with the floor and ceiling mounting;

FIG. 4 is a fragmentary perspective view of a partition of our invention having both a doorway and a window opening therein;

FIG. 5 is a fragmentary perspective view of a pair of partition walls of our invention forming a corner;

Figure 9:
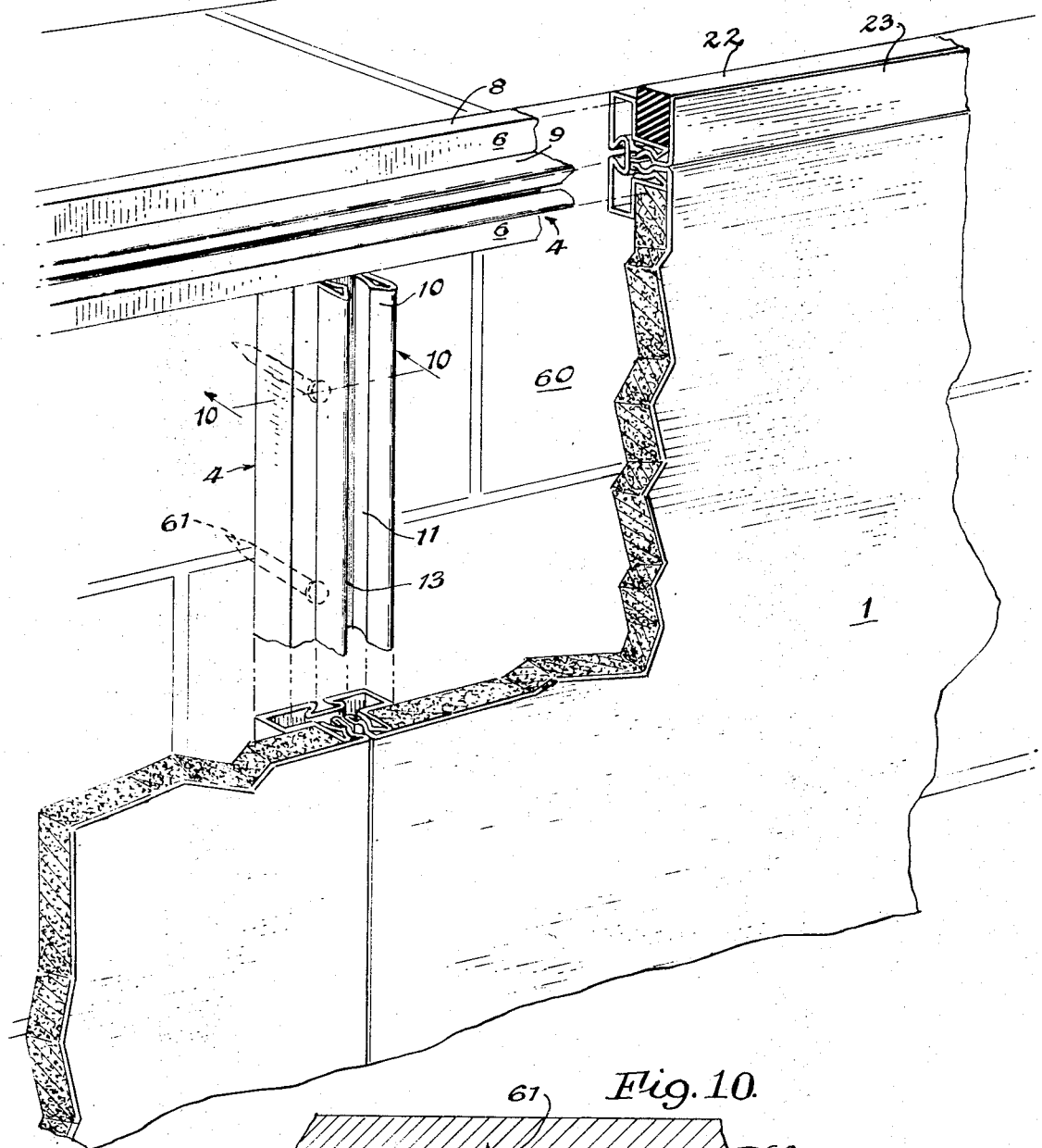
Figure 10:
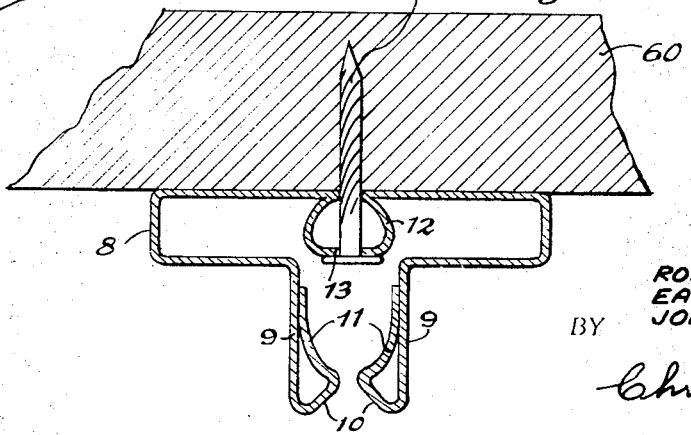

FIGS. 6 and 7 are fragmentary, horizontal sectional views thereof, on an enlarged scale, taken about on lines 6—6 and 7—7, respectively, of FIG.5;

FIG. 8 is a fragmentary detail view showing a wall structure of our invention incorporating a window;

FIG. 9 is a fragmentary, perspective view, primarily in elevation and with parts broken away to show details, illustrating our invention as applied to a single panel wall construction;

FIG. 10 is a horizontal, sectional detailed view thereof taken about one line 10—10 of FIG. 9.

FIG. 11 is a fragmentary, perspective view of an end corner of a partition such as shown in Fig. 4, on an enlarged scale and with parts broken away for greater clarity;

FIG. 11A is a perspective view of the end corner block of Fig. 11;

FIG. 12 is a view in front elevation of a panel connector of our invention;

FIG. 13 is a view thereof in end elevation; and

FIG. 14 is a fragmentary, detail perspective view showing a retaining spacer clip in its position of use.

DETAILED DESCRIPTION OF THE ILLUSTRATED EMBODIMENT

Referring now in detail to the illustrative embodiment depicted in the accompanying drawings, our invention is particularly adapted for double wall partitions such as shown for example in FIGS. 1 and 2 and comprising opposed panel members 1 defining opposite wall surfaces extending from the floor 2 to the ceiling 3. It will be apparent, however, that the double wall construction of our invention can be used in perimeter walls as well as in partition walls.

In accordance with our invention, panels 1 are mounted and supported in properly spaced relation by means including panel connectors, generally designated 4, and it is a feature of our invention that connectors 4 extend not only vertically, but horizontally as well to receive the four side edge portions of the supported panel 1. Further, it is a particular feature of our invention that panel connectors 4, whether horizontal or vertical, are maintained in properly spaced relation by spacer clips, generally designated 5, which extend therebetween as seen for example in FIGS. 2, 4, 8 and 11.

Panel connectors 4 and spacer clips 5 comprise the essence of our invention. As shown in FIGS. 12 and 13, panel connectors 4 can comprise a sheet metal fabrication of unitary, one-piece construction formed to provide a rectangular body portion having a front face 6 and a rear face 7 joined and spaced apart by opposite side faces 8. Faces 6 and 7 are generally parallel, and there are in fact a pair of front face portions 6 on each connector 4 together with a pair of flange portions 9 extending outwardly therefrom in a direction generally normal thereto, away from face 7. Face portions 6 and flange portions 9 thereby define a pair of corners adapted to receive the edge portions of adjacent panel member 1, with the panel resting against the face 6 as will be described hereafter. The metal or other sheet material of which connectors 4 are fabricated also is folded over at the outer end of flanges 9 to provide cam surfaces 10 leading to opposed shoulder portions 11, the opposite edges of the sheet material retreating and terminating within the opening provided between flanges 9, as clearly shown for example in FIG. 13.

Connector 4 also is formed to provide an internal channel having inwardly diverging side walls 12 leading to a rear wall 13 and providing a restricted inlet opening 14 through face 7. Channels 12–14 extend the full length of connector 4 in alinement with the opening between flanges 9, and the channel proper being entirely confined within the rectangular body portion 6–8 of the connector as shown.

Spacer clips 5 each comprise a main body portion 15 spanning the space between a pair of opposed panel connectors 4 and having at opposite ends thereof locking heads 16 joined to body 15 by restricted or reduced width neck portions 17. Spacer clips 5 are conveniently fabricated by punching the same from a sheet of steel, aluminum or other suitable material, and preferably have a material thickness less than the width of inlet opening 14 to the connector channels. The heads 16 fit within the channels 12, 13 with necks 17 extending through openings 14, to interlockingly engage a pair of panel connectors 4 at opposite ends of spacer clips 5.

When assembling a wall in accordance with our invention the connector members 4 are erected, as will be described in greater detail hereafter, and spacer clips 5 are inserted therebetween. To do this, clips 5 are initially rotated to a position 90° from the positions shown in the various drawing figures. This alines the thickness of clips 5 with channel openings 14, permitting heads 16 to be inserted through openings 14. Clips 5 then are twisted 90°, to the positions shown in the drawing. This confines heads 16 within channels 12–14 the relative sizes being such as to provide a snug-fitting interlocking engagement between spacer clips 5 and panel connectors 4.

It is contemplated that each panel member 1 will include a body 18 of gypsum, wallboard or any other suitable material, covered with a skin 19 of metal or other thin sheet material which can be painted or decorated to provide any desired effect. Further, it is contemplated that skin 19 will extend beyond panel body 18 at its edge portions, and will be formed to provide an inturned skirt 20 adapted to be inserted between the flanges 9 of the adjacent connectors 4. Skirts 20 are formed to provide inturned shoulders 21 engaging behind connector shoulders 11 with a snap fit. Therefore, when mounting panels 1 in place, they are positioned against faces 6 of the surrounding panel connectors 4, and the shouldered skirts 20, 21 are snap fitted in place between flanges 9 and behind shoulders 11.

When assembling a double wall, a pair of connectors 4 are arranged horizontally and secured to ceiling 3, and another pair of connectors 4 are arranged horizontally and mounted on floor 2. The ceiling and floor connectors 4 are mounted in position using spacer clips 5' which are like spacer clips 5 but have internally threaded brackets 24 thereon adapted to receive jack screws 25 having heads 26. At the upper end of the wall, spacer clip screws 25 are threaded into the lower side of box-sectioned mounting clips 37 having ears 38 adapted to overlie the lateral flanges 39 of an inverted T beam 40 such as are used to support suspended ceiling tiles. Clips 37 can be slid along beam 40, for positioning as desired. However, other ceiling fastening arrangements can be used. At the lower end of the wall, jack screw heads 26 are slidably confined in channel 27, for selective positioning therealong. Channels 27 are nailed or otherwise fastened to the floor, in the center line of the wall, and after spacer clips 5' have been inserted and interlocked between the horizontal connectors 4, by twisting the spacer clips relative to the connectors through 90° as previously described, the jack screws 25 at the ceiling are threaded into the clips 37 until the ceiling connectors 4 are properly horizontally oriented. The spacer clips 5' are interlocked with the floor connectors in like manner, and then applied to jack screws 25 which can rotate within their heads 26 if the latter are not free to rotate in channel 27. The jack screws 25 at the floor are rotated until the floor connectors 4 are properly horizontally orientated and at the correct spacing from the ceiling mounted connectors for the size of panel to be used.

The upper half of the front face 6 of ceiling connectors 4 can be left exposed, providing a reveal, or they can be filled in by a strip of resilient, cushioning material 22 which can be covered by a decorative surface 23 formed as a skin similar to 19 and having a shouldered skirt which snaps into place against panel skirt 20 as shown at the top of FIG. 4. Cushion 22 will deaden sound transmission between the wall and ceiling 3, and similar cushions 22 can be provided at the floor level, if desired, as shown in FIG. 1.

The space between floor 2 and the adjacent connectors 4 can be closed by means of generally L-shaped base plates 32 having a lower horizontal flange adapted to seat on floor 2 and a larger, vertical flange formed with vertically elongated slots 33 therethrough, at spaced points therealong. Attaching clips 28 are provided for securing plate 32 in position against panel connectors 4. Each clip 28 is of generally U-shaped configuration having opposite side walls 30 at least one of which is provided with a shoulder-forming bead 31 therein. The web of clip 28 has a pair of outwardly offset, oppositely directed ears adapted to be inserted through base plate slots 33 when the parts are oriented as shown in FIG. 2A. Then, upon rotating clip 28 90° to the position shown in FIG. 2 and indicated in phantom in FIG. 2A, plate 32 will be locked to clips 28 by the ears 29. The beaded wall 30 of clip 28 then is snap-fitted into place behind the lowermost shouldered flange 9 of connector 4, thereby securing base plate 32 in place, as shown in FIG. 2. Plate 32 and connector ears 29 can be covered by a decorative shoe 34 of a size to extend above the upper edge of plate 32 from the floor 2. Shoe 34 can be made of plastic or other suitable material, adhesively bonded or otherwise secured in place against the lower end of the wall.

After the horizontal panel connectors 4 are positioned, the vertical panel connectors 4 are assembled in paired relation and positioned along horizontal connectors 4 at the proper, modular spacing for the particular panels 1 being used.

To hold the assembled vertical connectors 4 against falling laterally out of the wall, prior to the mounting of panel 1, we provide retainer spacer clips 36 (FIG. 14) which are identical with spacer clips 5 except that one or more upstanding fingers 41 are provided at opposite ends of body 15, the fingers 41 projecting from the same face of body 15 and being adapted to engage closely behind the horizontal panel connectors 4 as clearly shown in FIG. 14. Thus, clips 36 are initially oriented 90° out of the position shown in FIG. 14, to permit insertion of locking heads 16 through panel connector openings 14. Spacer clips 36 are arranged adjacent the opposite ends of vertical connectors 4 and then are twisted 90° in a direction positioning fingers 41 behind the adjacent horizontal connectors 4. Thus, at the upper end of the assembled vertical connectors 4 fingers 41 extend upwardly, while at the lower end of vertical connectors 4 fingers 41 extend downwardly. By engaging horizontal connectors 4 in closely adjacent, even abutting relation vertical connectors 4 are maintained in the plane of the wall as panels 1 are mounted thereon.

Once horizontal and vertical connectors 4 have been positioned, panels 1 are snap-fitted into place thereagainst, as previously described and as clearly evident from an inspection of the drawing figures.

Where a vertical or horizontal end of a wall is exposed, it can be closed by a cover comprising a pair of cover plates having right angularly related faces 42 and 43 as shown in FIG. 6. The faces 42 are adapted to extend to a point midway between the opposite panels of a double wall structure, one face 42 being folded or otherwise formed along its edge to provide a groove 44 adapted to receive an inwardly offset tongue 45 formed on the adjacent edge of the other face 42 in snug, slip-fitted engagement therewith. Faces 43 each are provided with skirts 20′ which extend substantially parallel to faces 42 and, like panel skirts 20 are formed to provide shoulders 21 for snap-fitted engagement behind the shouldered connector flanges 9.

Where an outside corner is to be enclosed, as shown in FIG. 7, one of the cover plate faces is elongated, as indicated at 44, and is formed with a skirt 20′ extending substantially normal thereto and adapted for snap-fit engagement with the adjacent connector 4, the right angularly related face 43 being omitted.

Where both horizontal and vertical ends are exposed, to form a corner, the corner can be closed by a block 35 as shown in FIG. 11. Block 34, shown in greater detail in FIG. 11A, has exposed horizontal and vertical faces 45 and 46 of a width equal to the combined width of cover faces 42. The undersurface of block 35, opposite face 45 is provided with a rectangular positioning boss 47 adapted to fit between faces 43 of the vertical panel connectors 4 and against the groove-forming fold 44, extending into the corners 49 (FIG. 6) defined by the enclosing cover plate faces 42 and 43. The rear face of corner block 35, opposite face 46 also is provided with a rectangular centering boss 47 adapted to fit between faces 43 of the horizontal connectors 4 and against the groove-forming fold 44. Corner blocks 35 can first be fitted in vertical connectors 4 and then swung into position against horizontal connectors 4 and it is contemplated that bosses 47 will fit relatively snugly, reinforcing the surrounding members while securely anchoring blocks 35 in position.

Where it is desired to provide a window, paired cover plates are used each having right angularly related faces 50, 51, the latter being provided with a shouldered skirt substantially parallel to face 50 and which can be identical with the panel skirts 20 for snap-fitted engagement with the adjacent panel connectors 4. Faces 50 extend substantially to the center of the wall, and each are formed to provide an upstanding flange 52 folded on itself and terminating in a horizontal flange 53 one of which is vertically offset relative to the other. Flanges 53 overlap, and with flanges 52 define a channel for receiving a gasket 54 in which a window pane 55 is mounted. The folded flanges 52 can be spaced to provide a resiliently yieldable gripping action, tightly engaging the gasket 54 and accommodating slight manufacturing tolerances. Obviously, if a double pane of glass or if a substantially thicker pane is used, the cover plates will be varied to position flanges 52 further apart, with the horizontal flanges 53 being extended to provide a window channel of the desired width.

Cover plates 42, 43 also can be used to enclose a door opening, and an open "window" through the wall, as shown in FIG. 4.

While the construction of our invention is particularly advantageous in connection with double wall partitions and perimeter walls, the panel connectors 4 also can be used in single panel walls. This is illustrated in FIGS. 9 and 10 where panel connectors 4 are nailed or otherwise fastened to a masonry wall 60, as by nails 61 extending through channels 12, 13 as clearly shown in FIG. 10. A driving implement can be inserted between flanges 9 for hammering nails 61 into the position shown.

By anchoring panel connectors 4 in the correct modular horizontal and vertical positions, panels 1 can be snap-fitted into place, as clearly shown in FIG. 9. Of course, connectors 4 can be nailed to furring strips on masonry wall 60, if desired. Base plate 32 and shoe 34 can be used to finish the wall, as previously described.

Accordingly, it is seen that our invention fully accomplishes its intended objects. Panel connectors 4 and spacing clips 5 provide a quickly assembled supporting framework on which panels 1 can be snap-fitted in place. The rectangular cross-section of the connector body portions provides a box beam of substantial strength, and since connectors 4 extend the full length and width of panel 1 they provide an extremely strong and rigid construction even where only a few spacing clips 5 are provided. It is believed that with two retaining spacer clips 36 at the upper and lower ends of the vertical connectors, only a single spacer clip 5 located halfway therebetween can provide the resulting assembly with more than sufficient strength in many installations. At the same time, there is virtually no volume of connecting material between the opposed panel connectors 4, whereby the space therebetween is virtually completely open for the passage of conduits and the like and whereby direct sound and temperature conduction is virtually eliminated.

The spacing between panels 1 of a double wall structure can be varied by providing spacer clips 5, 5′ and 36 having body portions 15 of different widths. These determine the spacing dimension between connectors 4, and can be considered as dimension clips. They are relatively inexpensive, and the furnishing of different sizes thereof is believed to represent a very practical approach, particularly since they are simply twisted into place, quickly and easily.

Panels 1 can be secured in place against faces 6 by batten strips adapted to interlock with connectors 4, instead of by panel skirts 20, where desired.

While we have illustrated and described in detail only a selected embodiment of our invention that has been done by way of illustration, without thought of limitation, it being intended to include within the scope of the amended claims all those variations and modifications which can be expected to occur to those skilled in the art.

Having fully disclosed and completely described our invention, and its mode of operation, what we claim as new is:

1. A panel connector comprising an elongated body member of generally rectangular configuration providing a pair of generally parallel spaced apart front and rear faces connected by a pair of side faces extending therebetween, a pair of generally parallel flanges extending from said front face in a direction generally normal thereto and away from said rear face for receiving the adjacent edge portions of a pair of panel members in the corners provided by said flanges and said front face, and means providing shoulders on said flanges for interlocking with shouldered panel attaching means, said rear face being adapted for attachment to a furring strip or other supporting surface, said rear face forming a channel disposed within the generally rectangular configuration of said body member and having a restricted inlet opening through the plane of said rear face, said channel being adapted to receive a spacer member therein through said rear face.

2. A panel connector as set forth in claim 1, comprising a one-piece unitary construction of sheet material, the opposite side edges of said material forming said shoulders and terminating within the opening between said flanges.

3. In a double wall, panel members providing opposed wall surfaces, and means mounting said panel members including vertical stud means comprising a pair of elongated panel connectors each having front and rear faces and a pair of generally parallel flanges extending from said front face in a direction generally normal thereto away from said rear face for receiving edge portions of said panel members in the corners provided by said flanges and said front faces, multiple spacer clips extending between said panel connectors at spaced points therealong, each of said spacer clips having a body portion and locking head portions joined thereto at opposite ends thereof, said panel connectors being arranged in spaced apart relation with said rear faces thereof facing each other, said rear faces being formed to provide locking head receiving means having restricted inlet openings, said head portions of said spacer clips fitting through said inlet openings when said clip is oriented in one position relative to said connectors, and said head portions interlocking with said receiving means when said clip is twisted relative to said connectors to another position.

4. A wall structure as set forth in claim 3, wherein said panel members have shouldered skirt portions received in the space between said flanges, said connectors being shouldered within said space for interlocking with said panel skirt portions.

5. A wall structure as set forth in claim 3, and cover plate means bridging said panel connectors comprising a pair of cover members interfitting each other between said connectors, each of said cover members having a shouldered flange interlocking with one of said connector flanges.

6. In a double wall, panel members providing opposed wall surfaces, and means mounting said panel members including vertical stud means comprising a pair of elongated panel connectors each having spaced apart front and rear faces and a pair of generally parallel flanges extending from said front face in a direction generally normal thereto away from said rear face or receiving edge portions of said panel members in the corners provided by said flanges and said front faces, a spacer clip extending between said panel connectors and means detachably interlocking said clip and said connectors for maintaining the latter in spaced relation, wherein said last-named means comprise a channel extending lengthwise of each of said connectors and having a restricted inlet opening through said rear face, said spacer clip having a body portion spanning the space between said connectors and locking head portions joined thereto at opposite ends thereof by restricted neck portions, said head and neck portions fitting through said inlet openings when said spacer clip is oriented in a predetermined position relative to said connectors, and said head portions being confined within said channels with said spacer clip and connectors interlocked in snug fitting engagement when said spacer clip is twisted relative to said connectors out of said predetermined position.

7. A wall structure as set forth in claim 6, together with a second pair of elongated panel connectors extending horizontally adjacent one end of said vertical connectors, said spacer clip being positioned intermediate the opposite ends of said vertical connectors, and a retaining spacer clip similar to said first-mentioned spacer clip extending between said vertical connectors adjacent said horizontal connectors, said retaining spacer clip having a pair of fingers engaging behind said horizontal connectors.

8. A wall structure as set forth in claim 6, together with a second pair of elongated panel connectors extending horizontally adjacent one end of said vertical connectors, and a mounting spacer clip similar to said first-mentioned spacer clip extending between said horizontal connectors, said mounting spacer clip having means receiving a screw fastener for mounting attachment to a supporting surface.

9. A double wall structure as set forth in claim 6, wherein each of said panel connectors comprises a one-piece unitary construction of sheet material, said front and rear faces being connected by a pair of side faces extending therebetween and defining therewith an elongated body member of generally rectangular configuration, said channel being disposed within the generally rectangular configuration of said body member and being formed by said rear face, said flanges being spaced apart to receive shouldered panel attaching means therebetween, the opposite side edges of said sheet material terminating in the space between said flanges and forming shoulders therein for interlocking engagement with such panel attaching means.

10. Means for supporting opposed panel members in a double wall comprising a pair of elongated panel connectors each having spaced apart front and rear faces connected by a pair of side faces extending therebetween and defining therewith an elongated body member of generally rectangular configuration, and a pair of generally parallel flanges extending from said front face in a direction generally normal thereto away from said rear face for receiving edge portions of said panel members in the corner provided by said flanges and said front faces, means providing shoulders on said flanges for interlocking with shouldered panel attaching means, said rearfaces forming channels disposed within the generally rectangular configuration of said body members and having restricted inlets opening through said rear faces, and at least one spacer clip extending between said connectors, said clip having a body portion and locking head portions at opposite ends thereof, said locking head portions fitting through said inlet openings when said spacer clip is oriented in a predetermined position relative to said connectors, and said head portions being confined within said channels to interlock said spacer clip and said connectors when said clip is twisted relative to said connectors into another predetermined position.

11. Means for supporting opposed panel members in a double wall as set forth in claim 10, wherein each of said panel connectors comprises a one-piece unitary construction of sheet material, said flanges of each said panel connector being spaced apart to receive shouldered panel attaching means therebetween, and the opposite side edges of said sheet material of each connector terminating in the space between said flanges thereof and forming shoulders therein for engagement with shouldered panel attaching means.

12. A single panel wall comprising, in combination with a base wall, a pair of panel members, a panel connector comprising an elongated body of generally rectangular configuration providing a pair of generally parallel spaced apart front and rear faces connected by a pair of side faces extending therebetween, said body being secured to said base wall, a pair of generally parallel flanges extending from said front face in a direction generally normal thereto and away from said rear face defining with said front face a pair of corners for receiving the adjacent edge portions of said pair of panel members, and means providing shoulders on said flanges, said pair of panel members each having shoulder means associated with said edge portions interlocking with said flange shoulders for maintaining said panel members in position against said front face, said rear face forming a channel disposed within the generally rectangular configuration of said body and having a restricted inlet opening through the plane of said rear face.

References Cited

UNITED STATES PATENTS

| | | | |
|---|---|---|---|
| 1,339,360 | 5/1920 | Leonard | 52—349 |
| 1,915,697 | 6/1933 | Robinson | 52—353 X |
| 2,101,952 | 12/1937 | Olsen | 52—242 |
| 3,381,438 | 5/1968 | Bohnsack | 52—619 X |
| 1,906,096 | 4/1933 | Priddy | 52—377 |
| 1,946,560 | 2/1934 | Wick | 52—281 X |
| 2,227,452 | 1/1941 | Jullien | 52—493 |
| 2,566,622 | 8/1951 | Millier | 52—690 |

FOREIGN PATENTS

| | | |
|---|---|---|
| 665,903 | 7/1963 | Canada. |
| 1,203,140 | 7/1959 | France. |
| 652,893 | 5/1951 | Great Britain. |

OTHER REFERENCES

German printed application, 1,055,793, April 1959, Groen.

ALFRED C. PERHAM, Primary Examiner

U.S. Cl. X.R.

52—241, 480, 481, 493, 696, 738